(12) United States Patent
Bonig et al.

(10) Patent No.: US 11,449,936 B2
(45) Date of Patent: Sep. 20, 2022

(54) DISTRIBUTED CREDIT CONTROL WITH CENTRALIZED ALLOCATION

(71) Applicant: Chicago Mercantile Exchange Inc., Chicago, IL (US)

(72) Inventors: Zachary Bonig, Skokie, IL (US); Matthew Morano, Tenafly, NJ (US); Francis Bernard Bakalar, Oak Park, IL (US); Baris Mestanogullari, Downers Grove, IL (US); James Allen Bailey, Western Springs, IL (US); Frank Kmiec, Carey, IL (US); Ari L. Studnitzer, Northbrook, IL (US); Pearce Ian Peck-Walden, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 29 days.

(21) Appl. No.: 16/445,129

(22) Filed: Jun. 18, 2019

(65) Prior Publication Data

US 2020/0402169 A1     Dec. 24, 2020

(51) Int. Cl.
  *G06Q 40/04*     (2012.01)
  *G06Q 40/00*     (2012.01)
  *G06N 20/00*     (2019.01)

(52) U.S. Cl.
  CPC ............ *G06Q 40/04* (2013.01); *G06N 20/00* (2019.01); *G06Q 40/125* (2013.12)

(58) Field of Classification Search
  CPC ........ G06Q 40/04; G06Q 40/00; G06Q 40/02; G06Q 40/025; G06Q 20/10; G06Q 40/06;
  (Continued)

(56) References Cited

U.S. PATENT DOCUMENTS 7,987,135 B2   7/2011   Callaway
7,996,301 B2   8/2011   Callaway
(Continued)

OTHER PUBLICATIONS

Extended European Search Report, from EP Applicaiton No. 20180091.9, dated Aug. 12, 2020, EP.
(Continued)

*Primary Examiner* — Alexander G Kalinowski
*Assistant Examiner* — Sanjeev Malhotra
(74) *Attorney, Agent, or Firm* — Lempia Summerfield Katz LLC (57) ABSTRACT

Systems and methods for controlling use of a credit pool in connection with electronic trading in a plurality of product groups via a set of match engines are described. Credit data indicative of a current magnitude of the credit pool is obtained. A plurality of allocations of the credit pool are determined, based on the credit pool, across the plurality of product groups. For each allocation of the plurality of allocations, allocation data indicative of the allocation is provided to a respective credit controller of a set of credit controllers. The respective credit controller is disposed at a respective match engine to which a respective product group of the plurality of product groups is assigned. The use of the credit pool for an incoming order in a respective product group is thus limited in accordance with the allocation data provided to the credit controller at the respective match engine.

17 Claims, 5 Drawing Sheets

(58) Field of Classification Search
CPC ...... G06Q 20/102; G06Q 20/40; G06Q 30/02;
G06Q 20/223; G06Q 20/227; G06Q
20/24; G06Q 30/0206; G06Q 30/0215;
G06Q 30/0238; G06Q 30/0635; G06Q
30/08; G06Q 40/08; G06Q 40/10; G07F
17/32; G07F 17/329; H04L 49/90; H04L
49/3036; H04L 49/3045; H04L 49/9057;
H04L 49/9063; H04L 49/9078; G06F
16/285
USPC ...... 705/14.17, 14.53, 26.81, 30, 36 R, 36 T,
705/37, 38, 39, 500; 370/229, 230.1,
370/235; 463/6, 25; 455/408; 709/203,
709/223; 706/47
See application file for complete search history.

(56) References Cited

U.S. PATENT DOCUMENTS

| | | | |
|---|---|---|---|
| 8,355,980 B2 | 1/2013 | Callaway | |
| 9,691,102 B2 | 6/2017 | Studnitzer | |
| 2002/0133455 A1* | 9/2002 | Howorka | G06Q 20/40 705/37 |
| 2003/0005107 A1* | 1/2003 | Dulberg | H04L 41/046 709/223 |
| 2003/0163414 A1* | 8/2003 | O'Brien | G06Q 40/06 705/38 |
| 2004/0042399 A1* | 3/2004 | Bly | H04L 47/10 370/230.1 |
| 2005/0226146 A1* | 10/2005 | Rider | H04L 49/9063 370/229 |
| 2005/0234814 A1* | 10/2005 | Jones | G06Q 40/00 705/38 |
| 2007/0265950 A1* | 11/2007 | Reuss | G06Q 40/00 705/36 R |
| 2008/0091632 A1* | 4/2008 | Buzzeo | G06N 5/043 706/47 |
| 2008/0119162 A1* | 5/2008 | Sivalingam | H04M 15/78 455/408 |
| 2008/0205278 A1* | 8/2008 | Garmire | H04L 49/9063 370/235 |
| 2008/0222054 A1* | 9/2008 | Blagg | G06Q 20/108 705/500 |
| 2010/0030705 A1* | 2/2010 | Tharmananthar | G06Q 40/04 705/37 |
| 2010/0205240 A1* | 8/2010 | Loefstrand | H04L 67/2814 709/203 |
| 2010/0228665 A1* | 9/2010 | Mathieson | G06Q 40/025 705/38 |
| 2011/0045899 A1* | 2/2011 | Amour | A63F 9/24 463/25 |
| 2011/0081955 A1* | 4/2011 | Lange | G06Q 40/04 463/6 |
| 2013/0246254 A1* | 9/2013 | Crooks | G06Q 40/02 705/38 |
| 2014/0006262 A1* | 1/2014 | Amour | G06Q 20/10 705/39 |
| 2014/0172529 A1* | 6/2014 | Blagg | G06Q 30/0233 705/14.17 |
| 2014/0188675 A1* | 7/2014 | Brown | G06Q 40/12 705/30 |
| 2014/0195347 A1* | 7/2014 | Adatia | G06Q 30/0255 705/14.53 |
| 2014/0229338 A1* | 8/2014 | Borders | G06Q 30/0206 705/26.81 |
| 2014/0310156 A1* | 10/2014 | Mordecai | G06Q 40/025 705/38 |
| 2015/0046238 A1* | 2/2015 | Di Franco | G06Q 20/4012 705/14.17 |
| 2015/0127509 A1* | 5/2015 | Studnitzer | G06Q 40/04 705/37 |
| 2015/0127510 A1* | 5/2015 | Studnitzer | G06Q 40/04 705/37 |
| 2015/0127513 A1* | 5/2015 | Studnitzer | G06Q 40/04 705/37 |
| 2015/0127514 A1* | 5/2015 | Studnitzer | G06Q 40/04 705/37 |
| 2015/0127515 A1* | 5/2015 | Studnitzer | G06Q 40/04 705/37 |
| 2015/0227890 A1* | 8/2015 | Bednarek | G06Q 10/0833 705/26.81 |
| 2015/0262297 A1 | 9/2015 | Callaway et al. | |
| 2016/0189479 A1* | 6/2016 | Arnone | G07F 17/3295 463/25 |
| 2017/0103461 A1* | 4/2017 | Acuña-Rohter | G06Q 40/04 |
| 2017/0124649 A1* | 5/2017 | Schonberg | G06Q 40/04 |
| 2017/0262935 A1* | 9/2017 | Studnitzer | G06Q 40/08 |
| 2018/0047099 A1* | 2/2018 | Bonig | G06Q 10/1093 |
| 2018/0108035 A1* | 4/2018 | Tiwari | G06F 16/285 |
| 2018/0121103 A1* | 5/2018 | Kavanagh | G06F 3/067 |
| 2018/0130081 A1* | 5/2018 | Stepanovich | G06Q 50/12 |
| 2018/0232721 A1* | 8/2018 | Cheek | G06Q 20/29 |
| 2018/0315025 A1* | 11/2018 | McKay | H04L 67/1044 |
| 2019/0005576 A1* | 1/2019 | Mick | G06F 9/06 |
| 2019/0228499 A1* | 7/2019 | Kacevas | G06T 1/60 |
| 2019/0377810 A1* | 12/2019 | Soni | G06F 16/2272 |
| 2020/0027137 A1* | 1/2020 | Miller | G06Q 30/0277 |
| 2020/0167869 A1* | 5/2020 | Magdelinic | G06K 9/6256 |
| 2020/0210983 A1* | 7/2020 | Black | G06Q 20/384 |

OTHER PUBLICATIONS

Examination Report in European Patent Application No. 20 180 091.9, dated Jul. 28, 2022, 10 pages.

* cited by examiner

| Prod Group | A | B | C | D |
|---|---|---|---|---|
| Initial Credit | $25m | $25m | $25m | $25m |
| Prob after 1 | 9/47 = 19% | 16/47=34% | 20/47=43% | 2/47=4% |
| Credit Rebalanced | $10.07m+9m=$19.07m | $18m+$16m $34m | $23m+$20m $43m | $2.12m+$2m $4.12m |
| Credit Remaining | $10.07m | $18m | $23m | $2.12m |
| Credit if no rebal | $14m | $9m | $5m | $23m |
| New Prob | 17.5% | 40% | 38% | 4.2% |
| Credit Rebalanced | (100-77)*175 +9m+3m = $16m | $9.2m + $16m + $20m=$45.2m | 8.74+26= $34.74m | $3.96m |
| Credit Remaining | $4m | $9.2m | $8.74m | $.96m |

FIG. 5

DISTRIBUTED CREDIT CONTROL WITH CENTRALIZED ALLOCATION

BACKGROUND

A financial instrument trading system, such as a futures exchange, referred to herein also as an "Exchange", such as the Chicago Mercantile Exchange Inc. (CME), provides a contract market where financial products/instruments, for example futures and options on futures, are traded. Typically, the Exchange provides for a centralized "clearing house" through which all trades made must be confirmed, matched, and settled each day until offset or delivered. The clearing house is an adjunct to the Exchange, and may be an operating division thereof, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a network. These "electronic" marketplaces have largely supplanted the pit based trading systems whereby the traders, or their representatives, all physically stand in a designated location, i.e. a trading pit, and trade with each other via oral and hand-based communication. In contrast to the pit-based trading system where like-minded buyers and sellers can readily find each other to trade, electronic marketplaces must electronically "match" the orders placed by buyers and sellers on behalf thereof.

Electronic trading systems may offer a more efficient and transparent system of trading. For example, in pit trading, subjective elements and limits on human interaction may unduly influence the process by which buyers and sellers come together to trade or otherwise limit the trading opportunities, limiting market liquidity. In contrast, an electronic exchange may be more objective when matching up a buyer and seller, relying solely on objective factors such as price and time of order placement, etc. As such, electronic trading systems may achieve more fair and equitable matching among traders as well as identify more opportunities to trade, thereby improving market liquidity.

DETAILED DESCRIPTION

Systems and methods for controlling use of a credit pool in connection with electronic trading in multiple product groups are described. The systems and methods address technical problems in controlling credit utilization that arise from trading involving a set of match engines disposed in a distributed network. For instance, the distributed network may be arranged such that match engines are located in New York, London, and Tokyo. At any one point in time during a day, one of the match engines is typically responsible for matching orders in a respective product group. Despite the multiple venues, electronic trading nevertheless allows any one market participant to place orders for products in different product groups virtually simultaneously. The disclosed systems and methods limit and otherwise control the utilization of credit in those and other electronic trading scenarios.

Electronic trading enables participants to trade products at multiple electronic venues, often within microseconds to milliseconds of each other. This aspect of electronic trading leads to possible overruns when a single pool of granted credit nears full allocation. For example, a trader with $4M in available credit can take a $2 m position in one venue, and a $3 m position in another venue, within microseconds of each other. Without the disclosed systems and methods, the trader will be allowed to take both positions despite that, in the aggregate, the trader has now exceeded the total credit available. In these and other ways, the disclosed systems and methods allow for the geographic distribution of venues without the latency risk inherent in other systems.

Previous credit control systems react to credit overruns, or slippage, after execution of the trade(s). Either the total credit available is adjusted upward by the creditors, or the market participant is forced to exit from one or more of the positions. In some cases, addressing slippage post-hoc is problematic because the amount of slippage is significant. For instance, a trader with $100M in available credit may easily take two $95M positions almost immediately. Slippage may thus approach 100% of available credit, multiplied by the number of active trading venues, or match engines, in the worst case scenario.

The disclosed systems and methods prevent slippage by decentralizing, or distributing, credit control functionality across the set of match engines. A credit controller is disposed at each match engine. In some cases, the credit controller is disposed within the match engine. In those and other cases, the credit controllers of the disclosed systems are configured to provide in-line credit control.

Slippage is also prevented because each credit controller is effectively allocated only a portion of the total credit available. As described herein, credit is allocated on a product group basis. The respective match engine responsible for a particular product group is provided with allocation data indicative of the allocation for that product group. The allocation data is provided before the order arrives, i.e., a pre-allocation of credit available for that product group. As a result, when an incoming order for that product group arrives at the match engine, the use of the credit pool is limited to the respective allocation for the product group to which the order is directed.

The disclosed systems include a processor to determine the allocations. The processor may be centralized despite the distributed nature of the credit controllers. The processor may thus be configured for cross-venue credit control and accordingly considered part of a cross-venue risk management module or system. For instance, the processor may be part of an exchange computer system at which risk and other management functionality is provided. The processor may monitor a number of trading activity and market data parameters to determine the allocations.

The allocations are determined by the processor in accordance with credit data indicative of current utilization of a credit pool. The allocations may thus be adjusted over time as a market participant increases or decreases trading activity in one product group. A number of trade history and market data points may be taken into consideration, as described below.

The disclosed embodiments are useful in connection with any security, derivative, or other financial product traded via any equity, options or futures trading system, e.g., exchange, Electronic Communication Network ("ECN"), Alternative Trading System ("ATS"), or market now available or later developed, e.g. cash, Futures, etc., as well as any instrument traded thereon. The disclosed embodiments may thus be used in connection with a variety of different trading environments, such as an exchange as described herein, or other environments that implement one or more economic markets where rights and obligations may be traded.

The trading environment to which the disclosed embodiments are applied may be characterized by a need to maintain market integrity, transparency, predictability, fair/equitable access and participant expectations with respect thereto. For example, an exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner and without unknown or unascertainable risks. In addition, it will be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g. that transactional integrity and predictable system responses are maintained.

As was discussed above, electronic trading systems ideally attempt to offer an objective, efficient, fair and balanced market where market prices reflect a true consensus of the value of products traded among the market participants, where the intentional or unintentional influence of human interaction is minimized, if not eliminated, and where unfair or inequitable advantages with respect to information access are minimized if not eliminated.

These and other aspects of the electronic trading environment present technical challenges and other problems that are addressed by the disclosed embodiments. For instance, the technical problem of slippage in credit control exclusively arises from the computerized and distributed nature of electronic trading. Because different products are traded in different venues, combinations of trades may exceed the total credit available when a purely centralized credit monitoring system is used. In contrast, slippage is prevented via the decentralization of the credit control functionality for product group-based allocation and other aspects of the disclosed systems and methods. The decentralized nature of the disclosed systems and methods is thus a technical solution to electronic trading slippage in credit control.

Other technical problems are addressed by the disclosed systems and methods. For instance, the manner in which credit is controlled at each match engine in the disclosed systems and methods improves processing times. The disclosed systems and methods remove the need to check in with a centralized credit monitoring system or device with each incoming order or after each trade. Such in-line, local credit control processing of the disclosed systems and methods may introduce zero perceptible delay in order processing. Furthermore, the disclosed systems and methods avoid introducing any delay upon completion of a trade because all of the credit control processing has been implemented up front, e.g., before entry into the order book.

Another example of a technical problem addressed by the disclosed systems and methods involves latency effects encountered during adjustments to the credit allocations. With each update to the credit allocations, there is a period of time during which a portion of the credit available is moving from one venue (or match engine) to another. That portion of the credit is thus unavailable for use during the transmit time. Despite the shortness of the transit time (e.g., a few milliseconds), the disclosed systems and methods may be configured to minimize the amount of time that credit is unavailable. The frequency of re-allocation may thus be optimized, customized, or otherwise adjusted to a suitable level. Different frequencies may be used for different product groups and/or different levels of market activity. In this way, the disclosed systems and methods may be suitably responsive to changing market conditions. Moreover, even when latency results in an improper rejection of an order (e.g., because the re-allocation of credit has yet to arrive at the venue), the result is preferable to the opposite, i.e., slippage, when credit is improperly extended.

A brief introduction to matching is now provided. Some products on an exchange are traded on an electronic trading platform (e.g., an electronic exchange), also referred to herein as a trading platform, trading host or Exchange Computer System, where market participants, e.g. traders, use software to send orders to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). The Exchange Computer System, as will be described below, monitors incoming orders received thereby and attempts to identify, i.e., match or allocate, one or more previously received, but not yet matched, orders, i.e., limit orders to buy or sell a given quantity at a given price, referred to as "resting" orders, stored in an order book database, where each identified order is contra to the incoming order and has a favorable price relative to the incoming order. An incoming order may be an "aggressor" order, i.e., a market order to sell a given quantity at whatever may be the resting bid order price(s) or a market order to buy a given quantity at whatever may be the resting ask order price(s). In particular, if the incoming order is a bid, i.e., an offer to buy, then the identified order(s) will be an ask, i.e., an offer to sell, at a price that is identical to or lower than the bid price. Similarly, if the incoming order is an ask, i.e., an offer to sell, the identified order(s) will be a bid, i.e., an order to buy, at a price that is identical to or higher than the offer price.

Upon identification (matching) of a contra order(s), a minimum of the quantities associated with the identified order and the incoming order is matched and that quantity of each of the identified and incoming orders become two halves of a matched trade that is sent to a clearinghouse. The Exchange Computer System considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

Traders access the markets on a trading platform using trading software that receives and displays at least a portion of the order book for a market, i.e., at least a portion of the currently resting orders. The trading software enables a trader to provide parameters for an order for the product traded in the market, and transmits the order to the Exchange Computer System. The trading software typically includes a graphical user interface to display at least a price and quantity of some of the entries in the order book associated with the market. The number of entries of the order book displayed is generally preconfigured by the trading software, limited by the Exchange Computer System, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

The disclosed systems and methods are compatible with any matching procedure or algorithm. Different products offered by a particular Exchange may use different matching algorithms. The manner in which orders are prioritized in the order book and/or allocated may thus vary. It will be appreciated that there may be other allocation algorithms, including combinations of algorithms, now available or later developed, which may be utilized in conjunction with the disclosed embodiments, and all such algorithms are contemplated herein.

Figure 1:
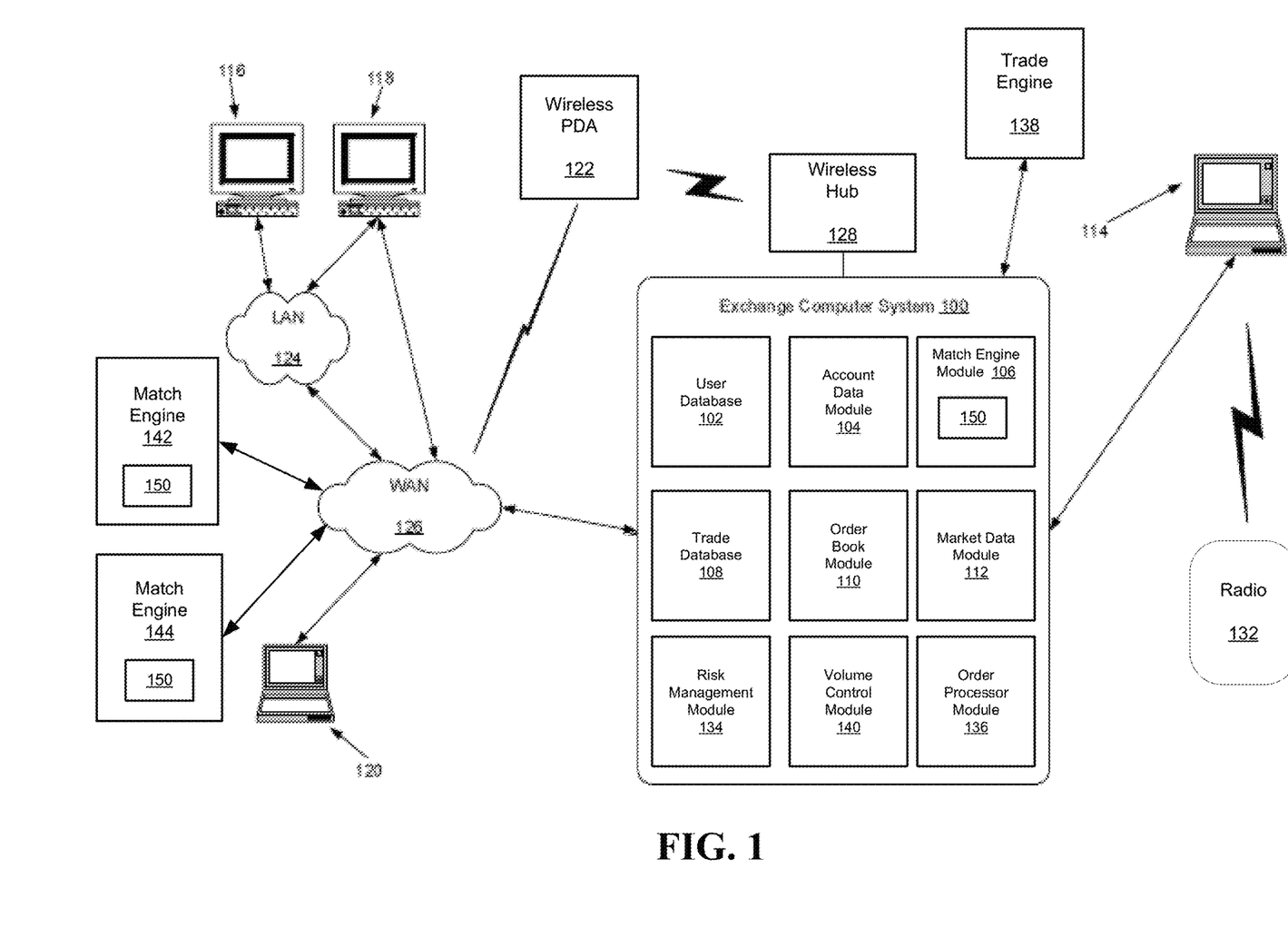
FIG. 1 depicts an illustrative computer network system that may be used to implement aspects of the disclosed embodiments.

FIG. 1 depicts a trading network environment for implementing trading systems and methods with credit control in accordance with one example. In this case, an exchange computer system 100 receives orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herein unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names and passwords. An account data module 104 may be provided, which may process account information that may be used during trades and/or credit control, as described below. A match engine module 106 may be included to match bid and offer prices and may be implemented with software that executes algorithms for matching bids and offers, in conjunction with controlling credit, as will be described in more detail below in connection with FIGS. 2 and 3. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. In some cases, the risk management module 134 may be used to implement the credit control processing described herein, as will be addressed in connection with the example of FIG. 2. An order processing module 136 may be included to decompose delta based and bulk order types for processing by the order book module 110 and/or match engine module 106. A volume control module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100. Any number of the above-described trading system components may be used or otherwise involved in implementation of the credit control of the disclosed methods and systems.

The trading network environment shown in FIG. 1 includes example computer devices 114, 116, 118, 120 and 122 which depict different example methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An example computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The example computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the example computer device 114 or a user thereof. The user of the example computer device 114, or the example computer device 114 alone and/or autonomously, may then transmit the trade or other information to the exchange computer system 100.

Example computer devices 116 and 118 are coupled with the local area network ("LAN") 124, which may be configured in one or more of the well-known LAN topologies, e.g. star, daisy chain, etc., and may use a variety of different protocols, such as Ethernet, TCP/IP, etc. The example computer devices 116 and 118 may communicate with each other and with other computer and other devices, which are coupled with the LAN 124. Computer and other devices may be coupled with the LAN 124 via twisted pair wires, coaxial cable, fiber optics or other wired or wireless media. As shown in FIG. 1, an example wireless personal digital assistant device ("PDA") 122, such as a mobile telephone, tablet based computer device, or other wireless device, may communicate with the LAN 124 and/or the Internet 126 via radio waves, such as via WiFi, Bluetooth and/or a cellular telephone based data communications protocol. The PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Example computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers that may maintain a market by providing constant bid and offer prices for a derivative, security, or other financial product to the exchange computer system 100, such as via one of the example computer devices depicted. The exchange computer system 100 may also exchange information with other trade engines, such as trade engine 138.

In the example of FIG. 1, the trading environment includes additional match engines 142, 144. The match engines 142, 144 may support trading activities in venues geographically remote from the exchange computer system 100. For instance, the match engines 142, 144 may be located in Tokyo and London, respectively, while the match engine module 106 is located in New York. The match engines 142, 144 are coupled with the above-described components of the exchange computer system via the Internet 126 and/or other distributed network. The match engines 142, 144 may thus be considered to be components of the exchange computer system 100. In such cases, the match engines 142, 144 may rely on one or more of the other components of the exchange computer system 100 to support the trading activities in the other venues. In other cases, one or more components of the exchange computer system 100 may be replicated in the other trading venues.

The trading environment may includes any number of additional match engines and other computers and systems coupled to the exchange computer system 100. Such computers and systems may include clearing, regulatory and fee systems.

The operations of computer devices and systems shown in FIG. 1 may be controlled by computer-executable instructions stored on a computer-readable storage medium (as opposed to computer-readable communication media involving propagating signals) or a non-transitory computer-readable storage medium. For example, the example computer device 116 may include computer-executable instructions for receiving order information from a user and transmitting that order information to exchange computer system 100. In another example, the example computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Credit control in connection with the trading activity enabled via the above-described exchange computer system 100 is now described. Following that, the implementation of credit control by or otherwise involving one or more components of the above-described exchange computer system 100 is then described.

The ability to see all incoming transactions and match events for a given set of markets allows for improved market protection mechanisms, such as improved credit controls based on pre-trade transactions, e.g. incoming orders, referred to as "in band." Credit controls generally evaluate trader activity, e.g. trade orders, against specified activity limits, e.g. credit limits. Credit controls may be applied to individual traders and/or organizations of traders, such as all of the traders working for a particular broker. Controlling use of a credit pool is thus provided by the disclosed systems and methods regardless of the number of market participants having access to the credit pool.

Applying credit controls have typically involved determining the risk incurred with each transaction undertaken by the market participant. That risk determination generally involves making one or more assumptions as to future events and applying those assumptions to the current transaction. Accordingly, credit controls have typically been applied after transactions have been processed, e.g. after the matching process, so as not to impede transaction throughput. Such credit control based on post-trade information is referred to as "out of band" credit control.

In contrast, the disclosed systems and methods control the use of a credit pool proactively. The credit control is therefore implemented in connection with, and applied to, incoming orders, rather than completed trades. Such proactive credit control eliminates the need, for example, to retroactively "unwind" completed transactions which exceeded a trader's credit limit. Instead, a given order that results in improper use of a credit pool (as described below) may be blocked or otherwise not accepted before a trade is executed. Such orders may be prevented from entry into an order book. The manner in which use of the credit pool is limited may vary. For instance, the order may be redirected or otherwise processed, e.g., for consideration by a creditor of an increase in the credit pool or a suspension of the credit control.

In the example of FIG. 1, credit monitoring is provided by the risk management module 134 and a set of credit controllers 150. The risk management module 134 is configured to coordinate activities across and otherwise direct the credit controllers 150. Alternative or additional processors, such as other components of the exchange computer system 100, may be used to provide the coordination, direction, and other management functions in other cases. The risk management module 134 may thus be considered one example of a management processor for credit control. In the example of FIG. 1, each credit controller 150 is disposed within one of the match engines 106, 142, 144. In other cases, the credit controller 150 may be disposed at the respective match engine. For instance, the credit controller 150 may be disposed in-line with the respective match engine such that all incoming orders directed to the match engine are investigated or otherwise processed by the credit controller for possible credit violations. The credit controllers 150 are allocated a portion of the credit pool by the risk management module 134 as described below. The risk management module 134 and/or other processor is configured to maintain a total view of a portfolio of a market participant, and reallocate the credit pool accordingly.

Credit control is provided via distributed components, the set of credit controllers 150, and a centralized or non-distributed component, the management processor (e.g., the risk management module 134). The combination of distributed and non-distributed elements of the credit control system constitutes a technical solution to the technical problems discussed herein. For instance, the in-line credit control provided via the credit controllers 150 avoids the slippage that is possible with out-of-band credit control. The processing demands associated with reversing trades are therefore also avoided. The architecture or arrangement of the trading environment may differ from the example of FIG. 1 and still provide decentralized or distributed credit control in accordance with the disclosed systems and methods. For instance, any number of match engine-credit controller pairs may be used.

Credit is allocated to the credit controllers 150 on a product group basis. The risk management module 134 and/or other management processor maintains credit in totality, and periodically reapportions the credit in accordance with one or more parameters. For instance, one factor may be indicative of the relative extent to which a market participant has traded in the respective product groups. For example, a market participant with a credit pool of $100M has historically traded around 25% in metals, 25% in equities, and 50% in energies. The management processor accordingly allocates $25 m, $25 m and $50 m to the respective credit controllers 150 associated with matching engines handling incoming orders for those product groups. If one match engine (i.e., trading venue) is handling more than one of the product groups, the corresponding credit controller 150 for that venue applies the respective limits to each product group separately. Such pre-allocation of credit by the management processor allows the disclosed systems and methods to maintain the flexibility of a single credit pool, while also preventing credit overruns. Further details regarding the allocation procedure are provided in connection with the examples of FIGS. 2-4.

While the credit controllers 150 are handling incoming orders, the management processor monitors all of the trading activity in all of the active markets, i.e., across all of the various trading venues, to determine whether the allocations should be adjusted. For instance, if the management processor determines that the market participant is using credit in one product group, e.g., equities, faster than normal, the management processor may reduce the credit allocated to one or more of the other product groups (e.g., energies and metals), and then allocate extra credit to equities. The market participant is thereby allowed to trade more than normal in that product group. The extent to which the management processor adjust the allocations may depend on a number of factors or parameters, including, for instance, various historical trends of the market participant's trading activity and/or the market.

The management processor may implement a predictive routine that takes the various factors and parameters as inputs. In some cases, the predictive routine may be or include a machine learning procedure. Alternative or additional procedures may be implemented, including, for instance, a Bayesian Probability routine. To support the implementation of the procedure, the management processor may perform one or more of the following functions:

(i) Monitor all order executions from all active venues, markets;

(ii) Compile all order executions into a set of held positions for each market participant;

(iii) Sum the sets of positions across the product groups to compute a total portfolio;

(iv) Maintain the traded positions currently held by the market participants;

(v) Maintain historical trends of portfolio utilization for market participants over time (e.g., last few weeks to months);

(vi) Maintain an aggregate trend for a "generic" trader for when a new market participant is added to the system; and, (vii) Maintain some measure of book depth, price movement, and/or volatility for each product group market, e.g., at each venue.

Using any combination of these or other factors and parameters, the management processor may periodically assess credit utilization of an individual market participant against her historical trend, and/or assess the current change in market dynamics, to adjust credit. In this way, the credit allocations may be adjusted pre-emptively (i.e., before the credit is needed) and transactionally (i.e., the credit is deducted from one product group's allocation before being added at another group's allocation).

Figure 2:
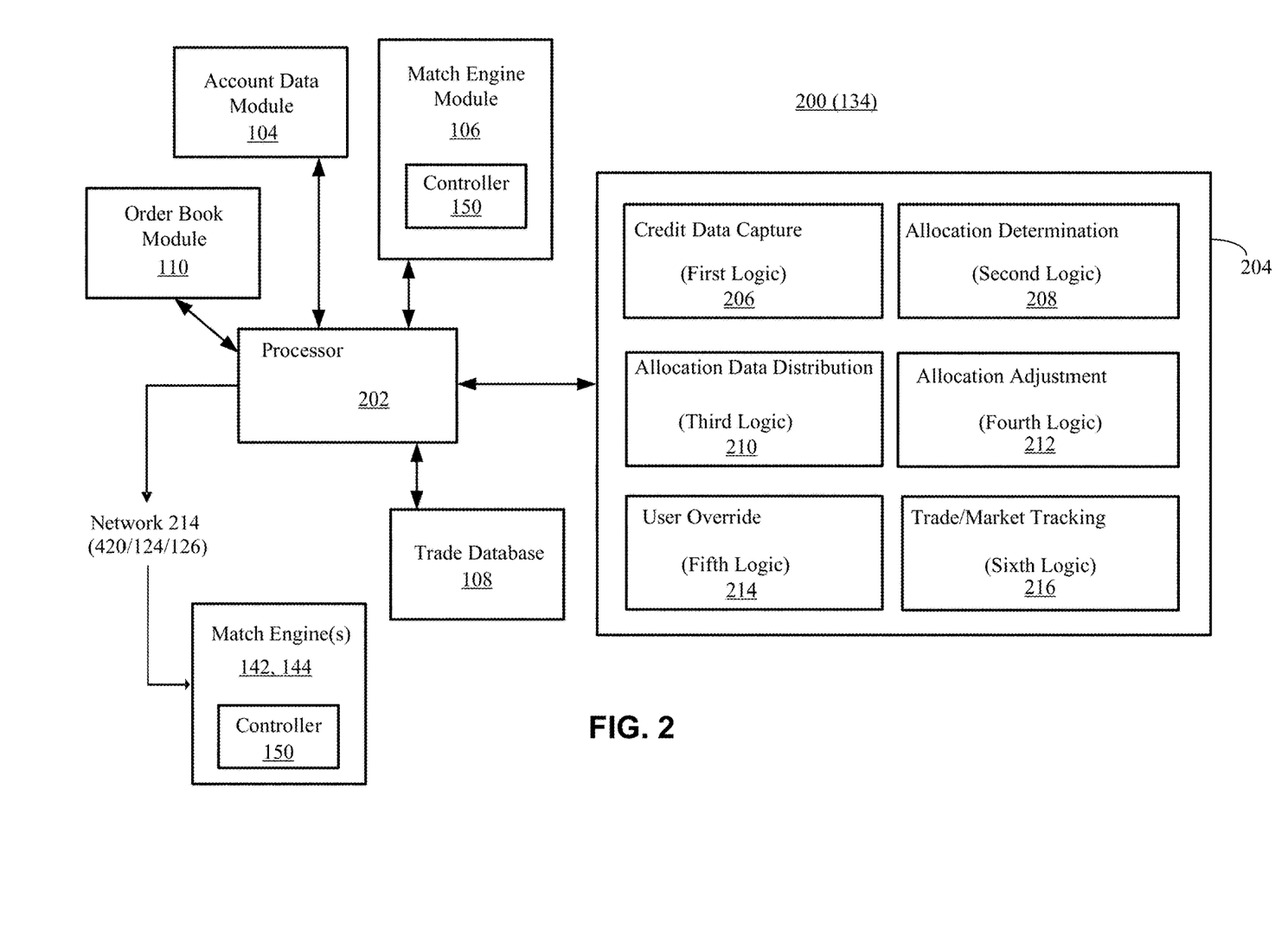
FIG. 2 is a block diagram of a system for controlling use of a credit pool in accordance with one example.

FIG. 2 depicts a system 200 for controlling use of a credit pool in connection with electronic trading in a plurality of product groups. The system 200 may correspond with some or all of the components of the trading environment or exchange computer system described above in connection with FIG. 1. For instance, one or more elements of the system 200 may be or otherwise correspond with the risk management module 134 (FIG. 1). In this case, the system 200 includes a processor 202 and a memory 204 that may be part of the risk management module 134 and/or another module or processor. The processor 202 may be considered or referred to as a management processor, as described above.

The system 200 may include a set of match engines disposed in a distributed network arrangement. One or more of the match engines may be local relative to, e.g., co-located with, the processor 202. In the example of FIG. 2, the system 200 includes the match engine module 106, which may be implemented on the same computer system having the processor 202. The system 20 further includes the match engines 142, 144, which are coupled to the processor 202 via a network 214, which may be or include one or more of the networks 124, 126 described above in connection with FIG. 1, and/or another network.

Each product group of financial products is assigned to a respective one of the match engines, as described above. The assignment may change throughout a given trading day, i.e., as the day progresses. For instance, a product group may be actively traded in one trading venue during certain hours of the day, and another trading venue during other hours.

The system 200 further includes a set of credit controllers 150 disposed in the distributed network. In this example, the credit controllers 150 are disposed in the network arrangement established by the network 214. Each credit controller 150 is disposed at a respective one of the match engines 106, 142, 144. In this example, each match engine 106, 142, 144 includes a respective one of the credit controllers 150. Each credit controller 150 may thus be implemented inside one of the match engines, although the extent of the integration may vary.

The processor 202 is in communication with at least some of the match engines 106, 142, 144 via the distributed network. In this case, the processor 202 communicates with the match engines 142, 144 via the network 214.

The memory 204 is coupled with the processor 202 to provide access to computer-executable instructions stored on the memory 204. The instructions are directed to the allocation and otherwise managing the credit controllers 150. In this example, the memory 204 has six sets of instructions arranged in respective logic units stored therein. Each logic unit is executable by the processor 202. The number of logic units or instructions sets may vary. For example, the instruction sets may be integrated with one another to any desired extent. Alternative instructions may also be included.

The system 200 includes first logic 206 that, when executed by the processor 202, causes the processor 202 to obtain credit data indicative of current utilization of the credit pool. The credit pool may be or include funds available for use in trades by one or more market participants. The credit may be available as a result any number of financial arrangements by the market participant(s). For instance, the market participant(s) may have entered into a set of bilateral agreements. The credit pool then corresponds with the total amount of credit provided by the set of agreements. The manner in which the credit pool is created, provided, maintained, or otherwise obtained may vary.

The credit data may be obtained by accessing or otherwise communicating with one or more databases. In the example of FIG. 2, the processor 202 may access the account data module 104 and/or the trade database to obtain the credit data. Alternative or additional sources of the credit data may be used. The credit data may be directly captured or otherwise obtained, e.g., via a database request for the current account balance for a market participant. Alternatively, the credit data may be indirectly obtained, e.g., via a request for data from which the credit data may be derived. For example, the processor 202 may obtain first data indicative of the total, or initial, amount of the credit pool and second data indicative of any withdrawals. The first logic 206 may then cause the processor 202 to determine the credit data from the first and second data. The manner in which the credit data is determined may vary.

The system 200 includes second logic 208 that, when executed by the processor 202, causes the processor 202 to determine, based on the credit data, a plurality of allocations of the credit pool. The allocations are made across the plurality of product groups. As a result, each allocation of the plurality of allocations is directed to a respective product group of the plurality of product groups. For example, in a case where there are four product groups A-D, the second logic 208 causes the processor 202 to determine the allocation to each one of the product groups A-D. The allocation determination may be directed to an initial allocation to the product groups or an update or adjustment to a previous allocation.

The allocations are determined based on any number of factors or parameters. Example parameters include the past and current trading activity of the market participant(s) in the respective product group, the current positions of the market participant(s) in the respective product group, and the past and current market activity in the respective product group. To obtain data for these parameters, the second logic 208 may cause the processor 202 to access the order book module 110, the trade database 108, the account data module 104, and/or other databases or modules. Each parameter may be evaluated independent or relative to the other product groups. Additional, fewer, or alternative parameters may be used. For instance, any one of the parameters listed above in connection with FIG. 1 may be factored into the determination.

The manner in which the parameters are processed or otherwise used to determine the allocations may vary. In some cases, the second logic 208 causes the processor 202 to implement a predictive routine, such as a Bayesian probability procedure. Alternative or additional routines or procedures may be used, including various machine learning procedures.

The system 200 includes third logic 210 that, when executed by the processor 202, causes the processor 202 to provide, for each allocation of the plurality of allocations, allocation data indicative of the allocation to a respective credit controller 150 of the set of credit controllers 150. The respective credit controller 150 is disposed at the respective match engine 106, 142, 144 to which a respective product group of the plurality of product groups is assigned. For example, if product groups A and B are being traded at the match engines 142, 144, respectively, the processor 202 provides the allocation data for product group A to the credit controller 150 at the match engine 142, and the allocation for product group B to the credit controller 150 at the match engine 144. When multiple product groups are being handled by a single match engine, the allocation data for multiple product groups is sent to the credit controller at the single match engine.

Providing the allocation data to the credit controllers 150 limits the use of the credit pool on a product group basis. The allocation data configures the respective credit controller 150 such that, in connection with an incoming order in the respective product group at the respective match engine 106, 142, 144, the use of the credit pool is limited, in accordance with the allocation data provided to the respective credit controller 150 at the respective match engine 106, 142, 144. The use of the credit pool is accordingly limited to a respective allocation of the plurality of allocations for the respective product group.

The system 200 includes fourth logic 212 that, when executed by the processor 202, causes the processor 202 to adjust the plurality of allocations based on trading activity since determining the plurality of allocations. In some cases, the adjustment may be made in accordance with use of the credit pool allocation in a respective product group. For instance, if product group A was allocated $25M, and the market participant takes a position in product group A involving $5M of the allocation, then the allocation is adjusted via the fourth logic 212 to $20M. Alternatively or additionally, the adjustment is made to address increased activity in one or more of the product groups, i.e., with or without use of the credit pool allocation. For instance, if a market participant is increasingly placing orders and/or taking positions in product group A, the fourth logic 212 may cause the processor 202 to increase the allocation to product group A. Once the allocation adjustments are determined, the third logic 210 is further executable by the processor 202 to cause the processor 202 to provide, for each allocation of the plurality of allocations, further allocation data indicative of the plurality of adjusted allocations.

The nature of the allocation adjustment may vary. In some cases, the fourth logic 212 is configured to cause the processor 202 to repeat the allocation determination conducted via execution of the second logic 208. The fourth logic 212 may thus involve a trigger or other decision logic directed to evaluating when the allocation determination should be repeated. For example, an update to the allocation determination may be triggered upon the occurrence of a certain event, such as a market move greater than a threshold, and/or the publication of a news item. The nature of the event or other trigger may vary. Alternatively or additionally, the fourth logic 212 may decide when to adjust the allocations as well as determine the adjustments. In such cases, the allocation adjustment of the fourth logic 212 may or may not be similar to the allocation determination of the second logic 208. For instance, the allocation adjustment may be based on a limited set of factors, such as those that focus on recent developments in trading, account, and/or market activity.

The system 200 may be configured to address the movement of product groups between the match engines 106, 142, 144. The match engine handling the trading activity for a respective product group may change throughout the day. As one trading venue opens or closes, the match engine to which the product group is assigned may change. The third logic 210 may be further executable by the processor 202 to address such changes. In such cases, the third logic 210 causes the processor 202 to provide, the allocation data, for a respective allocation of the plurality of allocations, to a further credit controller 150 of the set of credit controllers 150. In that way, the allocation data is provided to the correct credit controller 150 as the electronic trading in the product group associated with the respective allocation moves to another match engine.

In the example of FIG. 2, the system 200 further includes fifth logic 214 that, when executed by the processor 202, causes the processor 202 to update the plurality of allocations in response to a user command. For instance, the user command may be directed to overriding one or more of the allocation determinations. The user may elect to select a set of initial allocations and/or adjust the allocations determined thereafter.

The system 200 may also include sixth logic 216 that, when executed by the processor 202, causes the processor 202 to track trading and/or market activity. In some cases, such tracking is implemented in parallel (e.g., concurrently) with the execution of one of the other logic units. Alternatively or additionally, the tracking is implemented intermittently (e.g., periodically). Either way, the tracking may be used to detect trading, market, publication, or other activity, which, in turn, may be used to trigger an allocation adjustment or determination.

Further details regarding the functionality provided via execution of the above-described logic units, and by the system 200 more generally, are provided in connection with the examples described below.

Figure 3:
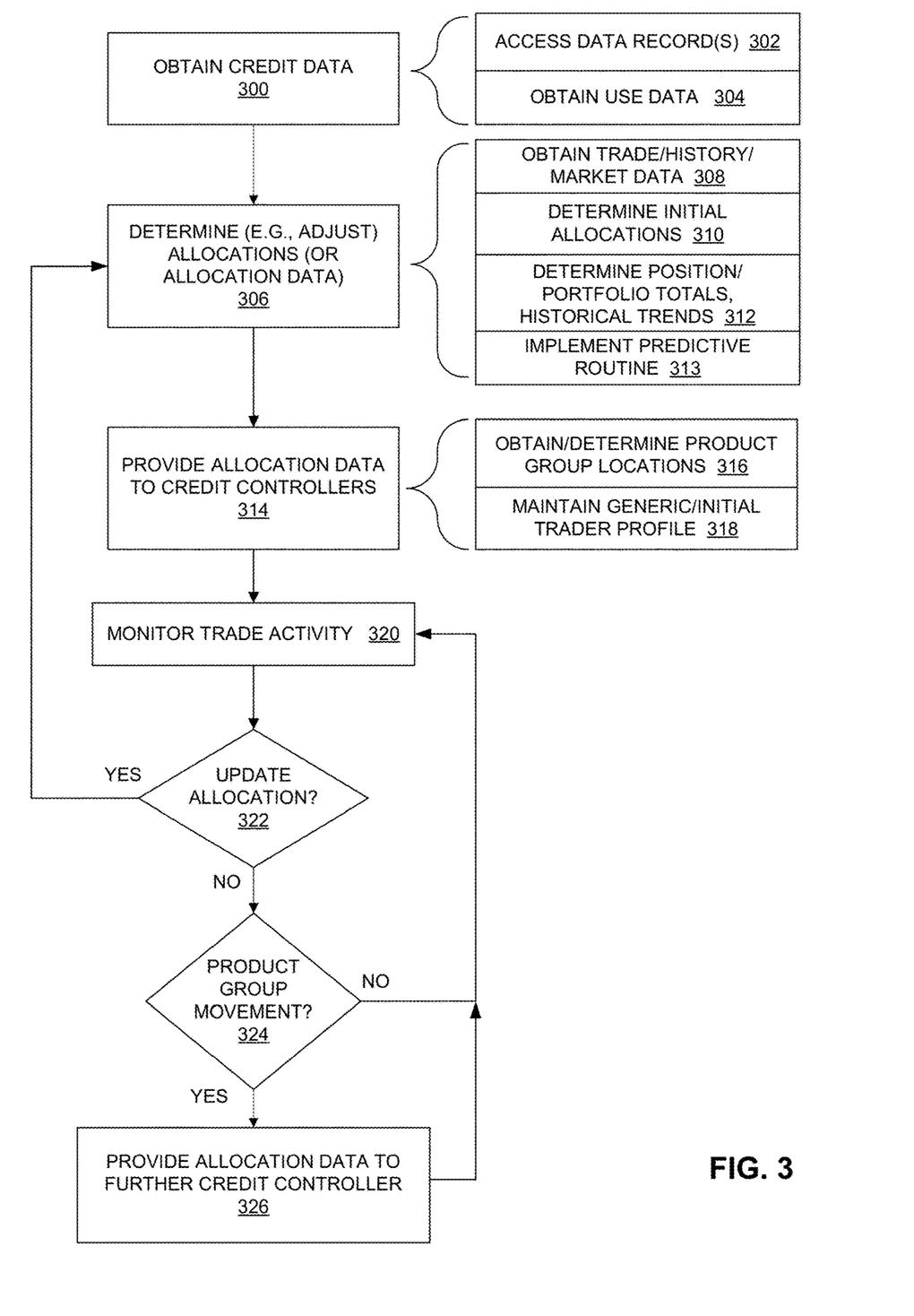
FIG. 3 is a flow diagram of a method for controlling use of a credit pool in accordance with one example.

FIG. 3 depicts a computer implemented method for controlling use of a credit pool in connection with electronic trading in a plurality of product groups. The method may show an example of the operation of the system 200 of FIG. 2, or another system.

Each act of the method is implemented by a processor, such as the processor 202 in the example of FIG. 2, a processor of the exchange computer system 100 in the example of FIG. 1, and/or another processor. The processor may be a processor used to implement a risk management module and/or another management processor. The processor may include any number of processors, such as processing cores or units, and may be disposed in any arrangement.

The method may begin with obtaining credit data [block 300]. The credit data is indicative of the current utilization of the credit pool. In some cases, the credit data is obtained by accessing one or more data records [block 302]. For instance, the credit data may be obtained by accessing the account data module 103 (FIG. 1) of the market participant(s). Alternatively or additionally, a database or other records dedicated to maintaining credit records may be accessed. Obtaining the credit data may also include obtaining data indicative of use of the credit pool [block 304]. Such use data is product group-specific. For example, the data may indicate the amounts of credit used to take positions in each product group.

A plurality of allocations of the credit pool are determined based on the credit data [block 306]. The allocations are across the plurality of product groups, such that each allocation is directed to a respective product. The allocations may be determined as described herein, including obtaining data indicative of trading activity, trading history, and/or market data [block 308]. Traders without a history of trades may have initial allocations determined in accordance with a generic trader or other predetermined profile [block 310]. In other cases, the initial allocations may be an even distribution of the credit pool across the plurality of product groups, a distribution of the credit pool indicative of past trading activity in the plurality of product groups, user selection of the plurality of initial allocations, or a distribution of the credit pool in accordance with relative liquidity of each product group. The procedure for determining the allocations may include acts directed to determining trading position and/or portfolio totals for the market participant(s) and/or the historical trends in such totals [block 312]. A predictive routine, such as a Bayesian probability model, may then be implemented to process the data compiled for the market participant(s) and the broader market [block 313]. The predictive routine, and any underlying model, may vary as described herein. For instance, various types of machine learning procedures may be implemented. The procedures may develop a model that takes into account monthly, seasonal, and other market changes for a particular product group. Other types of routines for predicting the likelihood of future trading based, for instance, on past trading in each product group may be used. In some cases, the likelihood of future trading is or includes the likelihood of an increase in trading from a current level of trading.

Allocation data for each allocation is provided to a respective credit controller of a set of credit controllers [block 314]. The set of credit controllers may be the credit controllers 150 described and shown in connection with FIGS. 1 and 2 as disposed at a respective match engine of a set of match engines. Each product group is assigned to one of the match engines. To that end, the locations (e.g., trading venues) at which trades in the product groups are being handled may be obtained [block 316]. For instance, the lead match engine for each particular product group may be identified. As described herein, the allocation data configures the credit controllers to limit the use of the credit pool on a product group-by-product group basis. As a result, each credit controller is allocated a respective portion of the credit pool for incoming orders in the product group(s) handled at that match engine.

In the example of FIG. 3, the allocation data is also stored and/or otherwise processed by the processor to maintain a generic trader profile [block 318]. For instance, the allocation data for each market participant may be averaged. The generic trader profile may be used to determine or set the initial allocations for a new trader. Using the generic trader profile, product groups that, on average, experience credit use are allocated a greater portion of a credit pool at the outset.

Trading activity for the market participant(s) is monitored after or during the allocation process [block 320]. For instance, data representative of any use of the credit pool is captured. The trading activity may also be representative of the broader market. If the trading activity involves use of the credit pool, and/or if the trading activity is significant in some other way [block 322], then control is returned to block 306 for an adjustment or update to the allocations, after which further allocation data is provided to the credit controllers [block 314]. If not, then the monitoring continues. For instance, further monitoring may be conducted to determine whether the product group assignments have changed due to, for instance, market or venue closing or other unavailability [block 324]. If there has been no product group movement, then control may return to block 320 for continued monitoring. If there has been product movement, then the allocation data is provided to the credit controller at the new match engine [block 326].

The manner in which the allocations are updated or adjusted may vary. The decision block 322 may analyze various trading and/or market parameters in deciding whether an updated is warranted. In some cases, adjusting the plurality of allocations is implemented after a predetermined number of orders (e.g., for the market participant(s) associated with the credit pool) have been entered via the set of match engines. For example, the allocations may be adjusted after every 10 trades or every 10 trades involving a withdrawal from the credit pool. Alternatively or additionally, adjusting the plurality of allocations is implemented after a predetermined time period has elapsed since the plurality of allocations were determined. For example, the allocations may be adjusted at the end of each trading day, after 10 trading days, or once per month.

The update frequency may also vary. Different product groups may have different update frequencies. For instance, a first product group may have a more dynamic market than a second product group. In that event, the update frequency of the first product group may be higher than the respective update frequency of the second product group. The update frequency may also change over time as market and/or trading conditions change.

In the example of FIG. 3, the decision block 322 may trigger an allocation update based on user selection of one or more allocations. In some cases, the user selection may override the allocations determined in the block 306. In other cases, the user selection may be directed to a plurality of initial allocations.

The order of the acts or steps of the operation may vary from the example shown. For example, the trade activity monitoring may be implemented concurrently with the other acts. Additional, fewer, or alternative acts may be implemented. For example, the method may include an additional allocation adjustment procedure dedicated to handling use of the credit pool. The additional procedure may be useful because an update to the underlying allocations may not be warranted as a result of such use, but nevertheless the allocation data used by one of the credit controller should be updated to reflect the use of the credit allocation.

Figure 4:
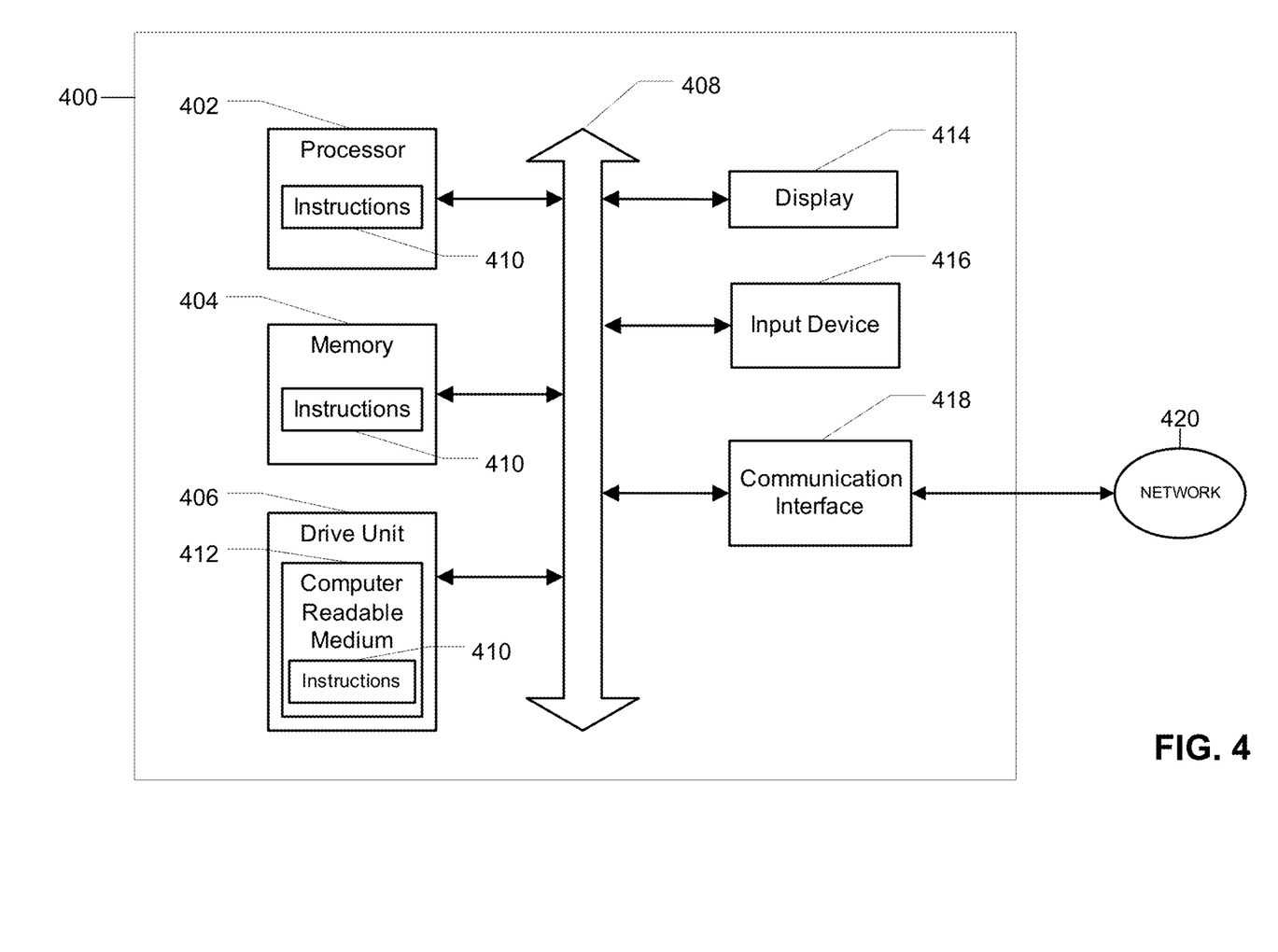
FIG. 4 shows an illustrative embodiment of a general computer system for use in or with the examples of FIGS. 1-3.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above may be a computer system 400 or a component in the computer system 400. The computer system 400 may implement a match engine on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate with a drive unit 406 and other components of the system 400 via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data.

The memory 404 is operable to store instructions 410 executable by the processor 402. The functions, acts or tasks illustrated in the figures or described herein may be performed by the programmed processor 402 executing the instructions 410 stored in the memory 404. The instructions 410 may be loaded or accessed from a computer-readable storage medium 412 in the drive unit 406 or other data storage device. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include an optical or other disk drive unit as the drive unit 406. The disk drive unit 406 may include the computer-readable storage medium 412 in which one or more sets of instructions 410, e.g. software, can be embedded. Further, the instructions 410 may embody one or more of the methods or logic as described herein. In a particular embodiment, the instructions 410 may reside completely, or at least partially, within the memory 404 and/or within the processor 402 during execution by the computer system 400. The memory 404 and the processor 402 also may include computer-readable storage media as discussed above.

The present disclosure contemplates a computer-readable medium that includes instructions 410 or receives and executes instructions 410 responsive to a propagated signal, which may be received via a communication interface 418. The system 400 may be connected to a network 420 to communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Figure 5:
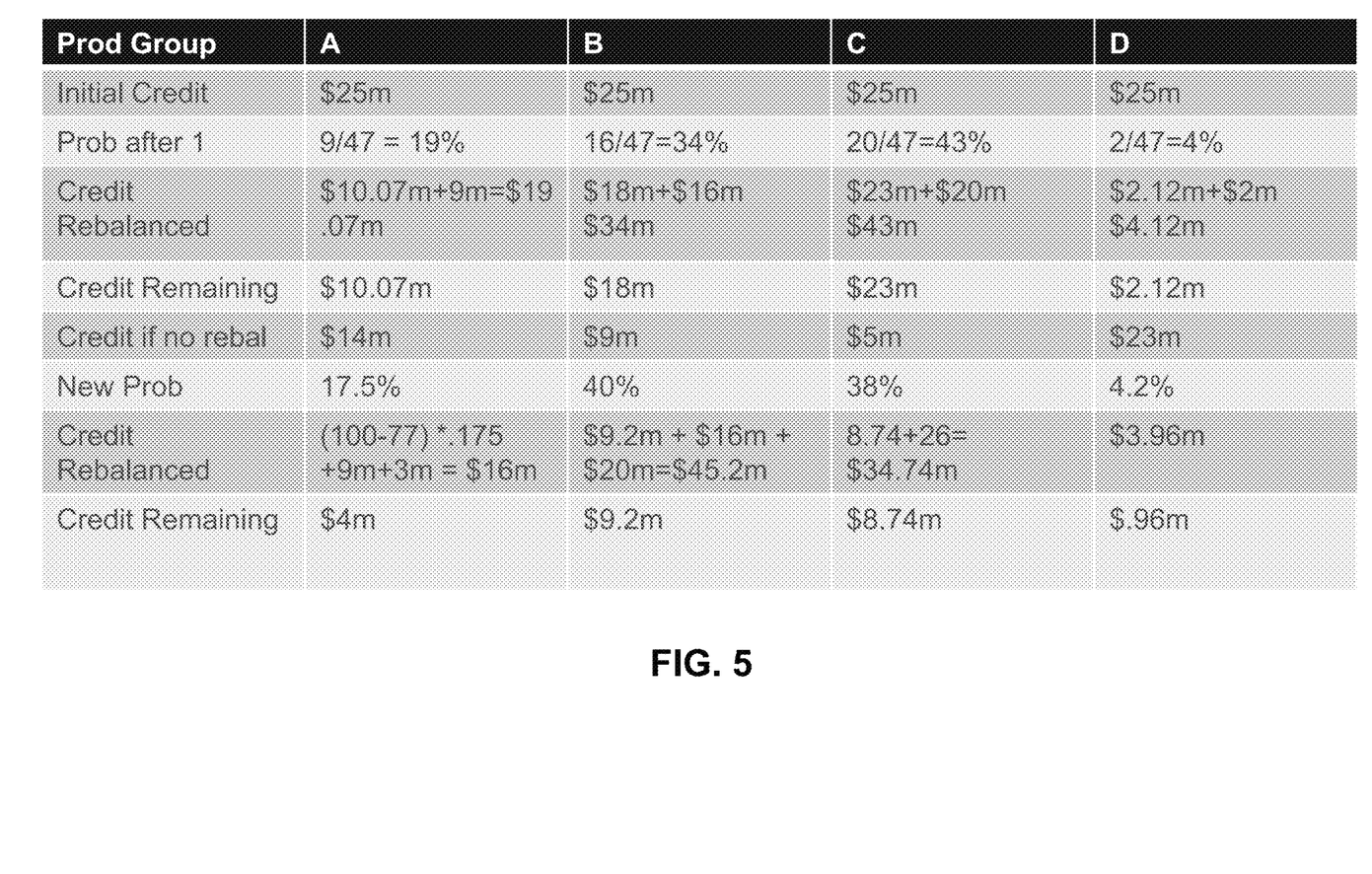
FIG. 5 depicts an example application of the credit control provided by the systems and methods of FIGS. 1-3 in accordance with one embodiment.

FIG. 5 depicts an example application of the disclosed systems and methods for controlling use of a credit pool. In this example, a $100M credit pool is allocated across four product groups A-D. The initial allocation is an even distribution, with $25M allocated to each product group. For ease in illustration, each trade is a $1M trade (e.g., a trade involving a $1M withdrawal of credit). In this example, reallocation occurs after a time interval, such as three trading days. In the first trading interval, the market participant has entered into 47 positions resulting from the following 47 orders: $9 m in orders for group A, $16 m in orders for Group B, $20 m for Group C, and $2 m for Group D.

In the example of FIG. 5, the allocation determination is based on a Bayesian probability model in which the past trading history of the market participant is used to determine a likelihood of future trading in the product groups. The probability after the first trading interval is shown in the row labeled "Prob after 1" or Probability after first interval. The probability for each product group is calculated in accordance with the fraction of trading activity that occurred in that product group. For instance, product group A had $9M in trading activity, which corresponds with 19% of the total trading activity of $47M.

The allocation data is then computed based on the determined allocations. In this example, the allocation data also reflects the amount remaining in the credit pool, i.e., $53M ($100M-47). For instance, with product group A, an allocation of 19% of $53M equals $10.07M. The allocation data for product group A may then reflect the total allocation, which equals the $10.07 allocation plus the $9M already used, or $19.07M, as shown in the row labeled "Credit Rebalanced." The allocation data may alternatively reflect only the amount remaining for use, or $10.07M, as shown in the row labeled "Credit Remaining." The table of FIG. 5 also includes a row labeled "Credit if no rebal" that indicates the amount of credit that would have been available without any rebalancing, or allocation update.

The row labeled "New Prob" indicates the probability of trading in each product group after another trading interval or other iteration of the allocation determination routine. In this example, $77M of the credit pool has been used, leaving $23M for allocation. The probability of use in product group A has fallen from 19% to 17.5%, with an additional $3M of use in product group A. Another row labeled "Credit Rebalanced" shows the computation of the new total allocation for each product group. In product Group A, the total remaining credit of $23M is multiplied by the new probability of 17.5% for a new remaining credit amount of approximately $4M, and a total allocation of $16M, which corresponds with the total amount of used credit ($9M+$3M) added to the new remaining credit.

FIG. 5 thus depicts how the allocations are determined on a product group basis in accordance with one example. The model and/or routine for determining the probabilities may be significantly more complex than the example shown. For instance, the routine may take into account a number of parameters in addition to the past trading activity of the market participant in each product group.

Embodiments of systems and methods for controlling use of a credit pool in connection with electronic trading in a plurality of product groups are described above. The disclosed systems and methods prevent credit overages, or slippage, allowed by previous credit controls. As described above, the credit allocations are determined automatically by product group. For product groups that move between trading venues during each given trading day, the credit allocations may follow the product groups from venue to venue by providing the allocation data to the credit controller at the match engine of the new venue. The credit controls of the disclosed systems and methods are thus enforced venue by venue, but with allocations determined product by product.

The disclosed systems and methods periodically or otherwise check consumption of credit to determine the probability of future credit consumption within each product group. The disclosed systems and methods may thus be based on the recognition that a customer trading heavily in one product is likely to continue trading in that product. In that way, credit is reallocated to heavily traded products.

The disclosed systems and methods may use machine learning or other artificial intelligence routines. The accuracy of the predictions may thus improve over time, i.e., with each update. The allocations may nonetheless be overridden by the market participant(s) in some cases.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the terms "computer-readable medium" and "computer-readable storage medium" include a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer-readable storage medium may be or include a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an example, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The disclosed computer programs (also known as a program, software, software application, script, or code) can be written in any form of programming language, including compiled or interpreted languages. The disclosed computer programs can be deployed in any form, including as a standalone program or as a module, component, subroutine, or other unit suitable for use in a computing environment. Such computer programs do not necessarily correspond to a file in a file system. Such programs can be stored in a portion of a file that holds other programs or data (e.g., one or more scripts stored in a markup language document), in a single file dedicated to the program in question, or in multiple coordinated files (e.g., files that store one or more modules, sub programs, or portions of code). Such computer programs can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for controlling use of a credit pool in connection with electronic trading in a plurality of product groups via a set of match engines disposed in a distributed network, in which each product group of the plurality of product groups is assigned to a respective match engine of the set of match engines, the method comprising:
    obtaining, by a processor, credit data indicative of current utilization of the credit pool, the processor being a non-distributed component of an exchange computing system and being in communication with the set of match engines via the distributed network;
    determining, by the processor based on the credit data, a plurality of allocations of the credit pool across the plurality of product groups, such that each allocation of the plurality of allocations is directed to a respective product group of the plurality of product groups;
    providing, by the processor, for each allocation of the plurality of allocations, allocation data indicative of the allocation to a respective credit controller of a set of credit controllers, the set of credit controllers being disposed in the distributed network to decentralize credit control across the set of match engines such that each credit controller is disposed at a respective match engine of the set of match engines to which a respective product group of the plurality of product groups is assigned;
    providing, by the set of credit controllers, credit monitoring such that, in connection with an incoming order in the respective product group at the respective match engine, the use of the credit pool is limited, in accordance with the allocation data provided to the respective credit controller at the respective match engine, to a respective allocation of the plurality of allocations for the respective product group;
    determining, by the processor, if the electronic trading in the product group associated with a respective allocation of the plurality of allocations moves to another match engine of the set of match engines and, if yes, providing, by the processor, the allocation data for the respective allocation to a further credit controller of the set of credit controllers;
    adjusting, by the processor, the plurality of allocations based on trading activity since determining the plurality of allocations; and
    providing, by the processor, for each allocation of the plurality of allocations, further allocation data indicative of the plurality of adjusted allocations.

2. The computer implemented method of claim 1, wherein adjusting the plurality of allocations is implemented after a predetermined number of orders have been entered via the set of match engines.

3. The computer implemented method of claim 1, wherein adjusting the plurality of allocations is implemented after a predetermined time period has elapsed since the plurality of allocations were determined.

4. The computer implemented method of claim 1, wherein:
    adjusting the plurality of allocations is implemented, for each product group of the plurality of product groups, at a respective update frequency;
    a first product group of the plurality of product groups has a more dynamic market than a second product group of the plurality of product groups; and
    the respective update frequency of the first product group is higher than the respective update frequency of the second product group.

5. The computer implemented method of claim 1, further comprising adjusting, by the processor, the plurality of allocations upon occurrence of a trigger event.

6. The computer implemented method of claim 1, wherein determining the plurality of allocations comprises implementing, by the processor, a routine to predict a likelihood of future trading in each product group of the plurality of product groups.

7. The computer implemented method of claim 6, wherein the routine predicts the likelihood of future trading based on past trading of a market participant associated with the credit pool in each product group of the plurality of product groups.

8. The computer implemented method of claim 6, wherein the routine predicts the likelihood of future trading based on historical market data for the electronic trading in each product group of the plurality of product groups.

9. The computer implemented method of claim 6, wherein the routine comprises a machine learning routine.

10. The computer implemented method of claim 6, wherein the routine comprises a Bayesian probability routine.

11. The computer implemented method of claim 1, wherein determining the plurality of allocations comprises determining, by the processor, a plurality of initial allocations based on (i) an even distribution of the credit pool across the plurality of product groups, (ii) a distribution of the credit pool indicative of past trading activity in the plurality of product groups, (iii) user selection of the plurality of initial allocations, or (iv) a distribution of the credit pool in accordance with relative liquidity of each product group.

12. The computer implemented method of claim 1, further comprising updating, by the processor, the plurality of allocations in response to a user command to override the determined plurality of allocations.

13. A system for controlling use of a credit pool in connection with electronic trading in a plurality of product groups, the system comprising:

a set of match engines disposed in a distributed network, in which each product group of the plurality of product groups is assigned to a respective match engine of the set of match engines;

a set of credit controllers disposed in the distributed network to decentralize credit control across the set of match engines such that each credit controller of the set of credit controllers is disposed at a respective match engine of the set of match engines;

a processor in communication with the set of match engines via the distributed network, the processor being a non-distributed component of an exchange computing system;

a memory coupled with the processor;

first logic stored in the memory and executable by the processor to cause the processor to obtain credit data indicative of current utilization of the credit pool;

second logic stored in the memory and executable by the processor to cause the processor to determine, based on the credit data, a plurality of allocations of the credit pool across the plurality of product groups, such that each allocation of the plurality of allocations is directed to a respective product group of the plurality of product groups;

third logic stored in the memory and executable by the processor to cause the processor to provide, for each allocation of the plurality of allocations, allocation data indicative of the allocation to a respective credit controller of the set of credit controllers, the respective credit controller being disposed at a respective match engine of the set of match engines to which a respective product group of the plurality of product groups is assigned; and fourth logic stored in the memory and executable by the processor to cause the processor to adjust the plurality of allocations based on trading activity since determining the plurality of allocations, wherein the set of credit controllers provide credit monitoring such that, in connection with an incoming order in the respective product group at the respective match engine, the use of the credit pool is limited, in accordance with the allocation data provided to the respective credit controller at the respective match engine, to a respective allocation of the plurality of allocations for the respective product group;

wherein the third logic is further executable by the processor to cause the processor to determine if the electronic trading in the product group associated with a respective allocation of the plurality of allocations has moved to another match engine of the set of match engines and, if yes, provide the allocation data for the respective allocation to a further credit controller of the set of credit controllers; and wherein the third logic is further executable by the processor to cause the processor to provide, for each allocation of the plurality of allocations, further allocation data indicative of the plurality of adjusted allocations.

14. The system of claim 13, further comprising fifth logic stored in the memory and executable by the processor to cause the processor to update the plurality of allocations in response to a user command to override the determined plurality of allocations.

15. A computer program product for controlling use of a credit pool in connection with electronic trading in a plurality of product groups via a set of match engines disposed in a distributed network, in which each product group of the plurality of product groups is assigned to a respective match engine of the set of match engines, the computer program product comprising one or more non-transitory computer-readable storage media having stored thereon computer-executable instructions that, when executed by a processor of an exchange computing system and a set of credit controllers of the exchange computing system, cause the exchange computing system to perform a method, the method comprising:

obtaining, by the processor, credit data indicative of current utilization of the credit pool;

determining, by the processor based on the credit data, a plurality of allocations of the credit pool across the plurality of product groups, such that each allocation of the plurality of allocations is directed to a respective product group of the plurality of product groups;

providing, by the processor for each allocation of the plurality of allocations, allocation data indicative of the allocation to a respective credit controller of the set of credit controllers, the set of credit controllers being disposed in the distributed network to decentralize credit control across the set of match engines such that each credit controller is disposed at a respective match engine of the set of match engines to which a respective product group of the plurality of product groups is assigned;

providing, by the set of credit controllers, credit monitoring such that, in connection with an incoming order in the respective product group at the respective match engine, the use of the credit pool is limited, in accordance with the allocation data provided to the respective credit controller at the respective match engine, to a respective allocation of the plurality of allocations for the respective product group;

determining, by the processor, if the electronic trading in the product group associated with a respective allocation of the plurality of allocations has moved to another match engine of the set of match engines and, if yes, providing, by the processor, the allocation data for the respective allocation to a further credit controller of the set of credit controllers;

adjusting, by the processor, the plurality of allocations based on trading activity since determining the plurality of allocations; and providing, by the processor, for each allocation of the plurality of allocations, further allocation data indicative of the plurality of adjusted allocations;

wherein the processor is a non-distributed component of the exchange computing system and is in communication with the set of match engines via the distributed network.

16. The computer program product of claim 15, wherein determining the plurality of allocations comprises implementing a routine to predict a likelihood of future trading in each product group of the plurality of product groups.

17. The computer program product of claim 16, wherein the routine predicts the likelihood of future trading based on (i) past trading of a market participant associated with the credit pool in each product group of the plurality of product groups, and (ii) historical market data for the electronic trading in each product group of the plurality of product groups.

* * * * *

UNITED STATES PATENT AND TRADEMARK OFFICE
CERTIFICATE OF CORRECTION

| | |
|---|---|
| PATENT NO. | : 11,449,936 B2 |
| APPLICATION NO. | : 16/445129 |
| DATED | : September 20, 2022 |
| INVENTOR(S) | : Zachary Bonig et al. |

It is certified that error appears in the above-identified patent and that said Letters Patent is hereby corrected as shown below:

In the Claims

Claim 15, Column 26, Line 19:
Please insert a --,-- after the word "processor"

Signed and Sealed this
Fifteenth Day of November, 2022

Katherine Kelly Vidal
*Director of the United States Patent and Trademark Office*